(12) United States Patent
Phillips (10) Patent No.: US 7,263,939 B1
(45) Date of Patent: Sep. 4, 2007

(54) SIMPLIFIED ELEVATED SAILING APPARATUS

(76) Inventor: Malcolm Phillips, 20 Washington Dr., Acton, MA (US) 01720

( * ) Notice: Subject to any disclaimer, the term of this patent is extended or adjusted under 35 U.S.C. 154(b) by 39 days.

(21) Appl. No.: 11/151,811

(22) Filed: Jun. 10, 2005

Related U.S. Application Data (63) Continuation-in-part of application No. 10/335,502, filed on Dec. 31, 2002, now Pat. No. 6,925,949.

(51) Int. Cl.
   *B63H 9/04* (2006.01)
(52) U.S. Cl. ............. 114/39.11; 114/39.29; 114/102.1; 114/102.16; 114/102.29; 244/24
(58) Field of Classification Search ............ 114/39.13, 114/39.29, 102.1, 102.11, 102.16, 102.29, 114/39.11; 244/24, 25, 29, 30, 31
   See application file for complete search history.

(56) References Cited

U.S. PATENT DOCUMENTS

| | | | | |
|---|---|---|---|---|
| 3,971,533 A | * | 7/1976 | Slater | .......................... 244/30 |
| 4,497,272 A | * | 2/1985 | Veazey | .................. 114/102.29 |
| 4,601,444 A | * | 7/1986 | Lindenbaum | ................. 244/26 |
| 4,889,297 A | * | 12/1989 | Ikeda | ............................. 244/5 |
| 6,402,090 B1 | * | 6/2002 | Aaron | ......................... 244/24 |
| 6,925,949 B1 | * | 8/2005 | Phillips | .................... 114/102.1 |

* cited by examiner

*Primary Examiner*—Sherman Basinger
(74) *Attorney, Agent, or Firm*—Arendt & Associates Intellectual Property Group; Jacqueline Arendt (57) ABSTRACT

An elevated sailing apparatus that extracts traction power from the wind. It operates without the heeling moment (typical of conventional sailboats), which constrains the design and limits the power that can be used. A wing or sail is attached beneath a streamlined blimp with aerodynamic stabilizers that keep both the blimp and the wing (or sail) directed into the wind. The blimp is directed into the wind for minimum drag. The wing (or sail) is directed into the wind for a desired angle of attack. The apparatus is tilted so that a combination of dynamic lift and lateral propulsive force is generated in addition to the static lift generated by the blimp. A single tether transfers these aerodynamic forces to a boat or other vehicle. Conventional electronically operated automatic and remote control systems can be used to adjust the tilt and to tack the apparatus.

1 Claim, 7 Drawing Sheets

SIMPLIFIED ELEVATED SAILING APPARATUS

CROSS-REFFERENCE TO RELATED APPLICATIONS

This application is a CIP of Ser. No. 10/335,502 filed Dec. 31, 2002 now U.S. Pat. No. 6,925,949 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to sailing apparatus, specifically an elevated sailing apparatus.

2. Description of Prior Art

Modern high-speed sailing can be characterized by the need for a righting moment to counter the heeling moment that is caused by the aerodynamic force developed by the sail acting on the mast and rigging. Multiple hulls or heavily ballasted keels are two approaches to providing the righting moment. Recently people have started using kites to reduce the heeling moment. The aerodynamic force generated by the kite acts near the water line of the vessel, rather than part way up the mast. However, these kites usually have two (or four) kite lines, and require constant attention to control. They may be damaged and are difficult to re-launch should they land in the water. U.S. Pat. No. 5,366,182 to Roeseler (1994) and U.S. Pat. No. 4,708,078 (1987) to Legainoux et al, describes such kite systems. Neither addresses the requirement of constant attention to control.

The Veazy U.S. Pat. No. 4,497,272 (1985) describes "mastless sails" which are applicable to low-speed and downwind sailing. It does not have the features necessary to achieve the high lift-to-drag ratio required for high-speed sailing. In particular it describes the use of a balloon rather than a streamlined blimp, and the use of a low aspect-ratio kite or spinnaker rather than a high aspect-ratio wing or sail. Control is only described in terms of sheets. The use of aerodynamic stabilizers, a single tether line, and electronic control systems are not described.

OBJECTS AND ADVANTAGES

Several objectives and advantages of my "Simplified Elevated Sailing Apparatus" are:

(a) Provide a propulsive force such that the heeling moment is negligible and the propulsive force is not limited by the righting moment available.
(b) Provide a propulsive force that has the high lift-to-drag ratio needed for high-speed sailing.
(c) Provide an increased propulsive force by utilizing the stronger winds available at about 100 ft above the water surface.
(d) Provide a propulsive force that can be transferred to the boat using a single tether.
(e) Provide a combination of static and dynamic lift so that the apparatus will remain in the air for a large range of wind speeds including zero wind speed.
(f) Provide an apparatus that may use electronically operated remote control and automatic altitude keeping systems.
(g) Provide an apparatus that is either dynamically stable or stabilized by automatic control systems so that constant attention is not required.
(h) Provide an apparatus that is easy to launch and retrieve.

Further objects and advantages will become apparent from a consideration of the ensuing description and drawings.

SUMMARY OF THE INVENTION

My "Simplified Elevated Sailing Apparatus" provides a new embodiment to my "Elevated Sailing Apparatus" application Ser. No. 10/335,502. It provides greater simplicity, by sharing the aerodynamic stabilizers between the blimp and the wing, while offering the same advantages.

My "Simplified Elevated Sailing Apparatus" has a wing (or sail) attached to the lower side of a streamlined, lighter-than-air blimp. Aerodynamic stabilizers (tail fins) keep both the blimp and the wing (or sail) directed into the wind. The blimp is directed into the wind for minimum drag. The wing (or sail) is directed into the wind for a desired angle of attack.

The blimp generates static lift to counter the weight of the apparatus. The wing is tilted so that it generates a lateral propulsive force in addition to dynamic lift. (Dynamic lift is the vertical component and lateral propulsive force is the horizontal component of the lift generated by the wing.) The wing is tethered to a vehicle and the tether transfers the forces generated by the wing to the vehicle, such that the vehicle is propelled across the water (or some other medium).

Several techniques for tilting the wing are described so that a desired ratio of dynamic lift to lateral propulsive force may be obtained. An aileron-style control-surface, a movable ballast, or a lateral control wing can used to control the tilt. A remote control system allows the wing or sail to be tilted from one side to the other so that the pilot may tack the apparatus.

This invention, by utilizing aerodynamic stabilization, allows high aspect-ratio low-drag wings to be used, which is required for high-speed sailing. Combining the aerodynamic stabilization for both the wing and the blimp reduces the parts, weight and complexity of the apparatus.

DRAWINGS—Reference Numerals 10 blimp
12 directional tail fins
14 spar
16 wing or sail
18 pylon
20 ballast or payload weight
22 starboard aileron style control surface
24 port aileron style control surface
26 hinge
28 tether
30 boat
32 winch
34 centerboard
36 hinge and actuator
38 actuator
40 actuator
42 wing angle of attack actuator
44 lateral control wing with control surface
46 lateral control wing actuator
48 harness
50 pylons
52 aircraft style aerodynamic stabilizers
54 static lift
56 center of mass
58 wing lift (combines dynamic lift and lateral propulsive force)
60 port wing lift
62 starboard wing lift
64 conventional radio control system
66 automatic altitude maintaining system
68 altitude or attitude sensor
70 lateral propulsive force resisting vehicle
72 hinge
74 aerodynamic lifting surface (wing or sail)

DETAILED DESCRIPTION OF THE INVENTION

Preferred Embodiment

Figure 1:
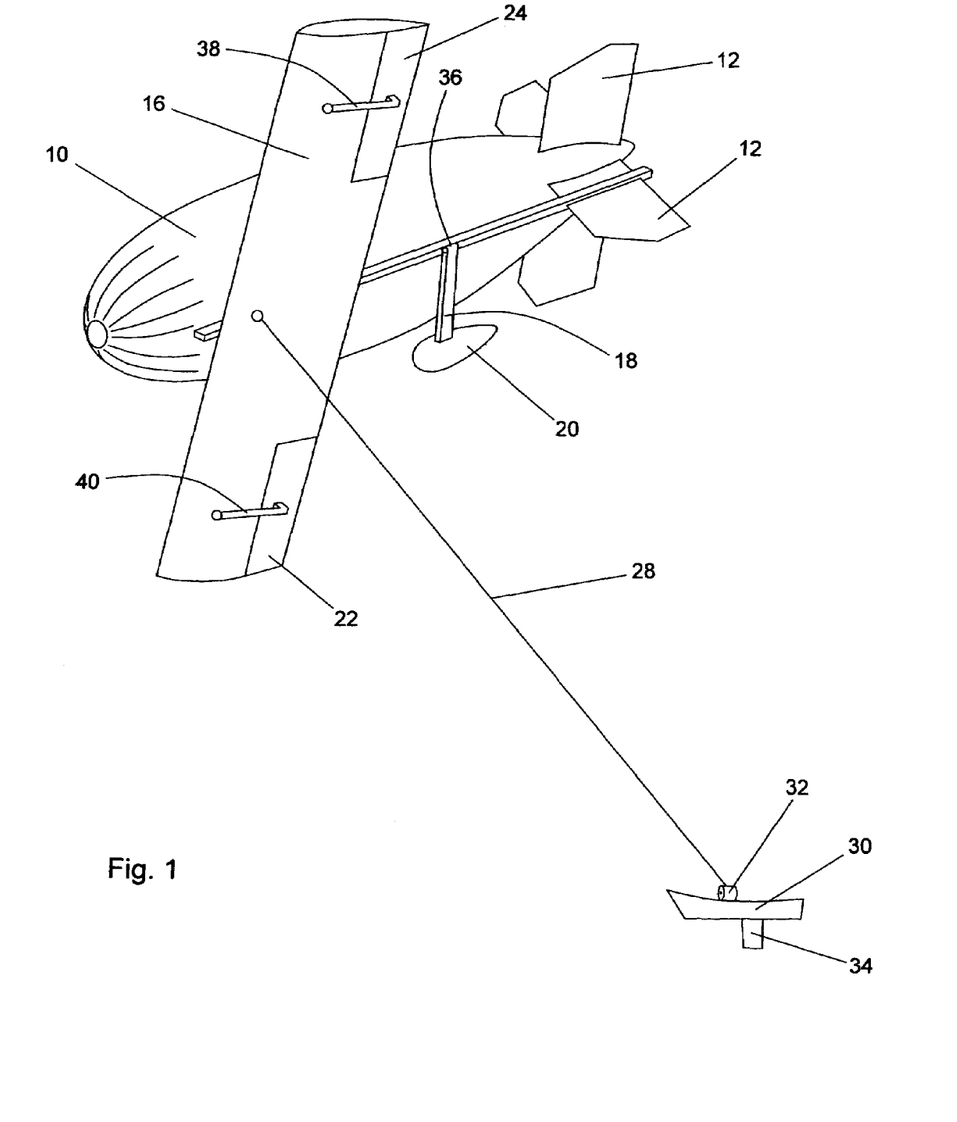
FIG. 1 shows a perspective view of the preferred embodiment of the sailing apparatus.

This invention can be readily understood by referring to FIG. 1. A streamlined blimp (or dirigible, or airship) 10 containing a lighter-than-air gas (helium or hydrogen), and having directional tail fins 12, has a longitudinal spar 14 attached to the lower side. A wing or sail 16 is attached beneath spar 14 at the forward end. Aerodynamic stabilizing forces are transferred from tail fins 12 to wing 16 by spar 14. (Spar 14 may be considered optional, since the skin of the blimp can also transfer these stabilizing forces.) A tether 28 is attached to the lower surface of wing 16 at the center of lift and connects to a boat 30. The elevated section comprising blimp 10, tail fins 12, spar 14 and wing 16 is termed the apparatus. Aerodynamic forces generated by the apparatus are transferred by tether 28 to boat 30.

The apparatus is tilted about the longitudinal axis so that wing 16 generates a lateral propulsive force in addition to a dynamic lifting force. FIG. 1. Shows two methods for tilting the apparatus. Either method, or a combination of both may be used.

A ballast or payload weight 20 attached to the lower end of a pylon 18 is connected by a hinge and actuator 36 to spar 14 so that ballast or payload weight 20 can be shifted from side to side in an arc about hinge 36. A conventional remote control system (not shown) can swing ballast or payload weight 20 from one side to the other so that the whole apparatus is tilted about the longitudinal axis.

Aileron-style control-surfaces 22 and 24 are placed on the outer trailing edges of wing 16. These control surfaces are used together with actuators 38 and 40 and a remote control system (not shown) to tilt the apparatus about the longitudinal axis.

Figure 2:
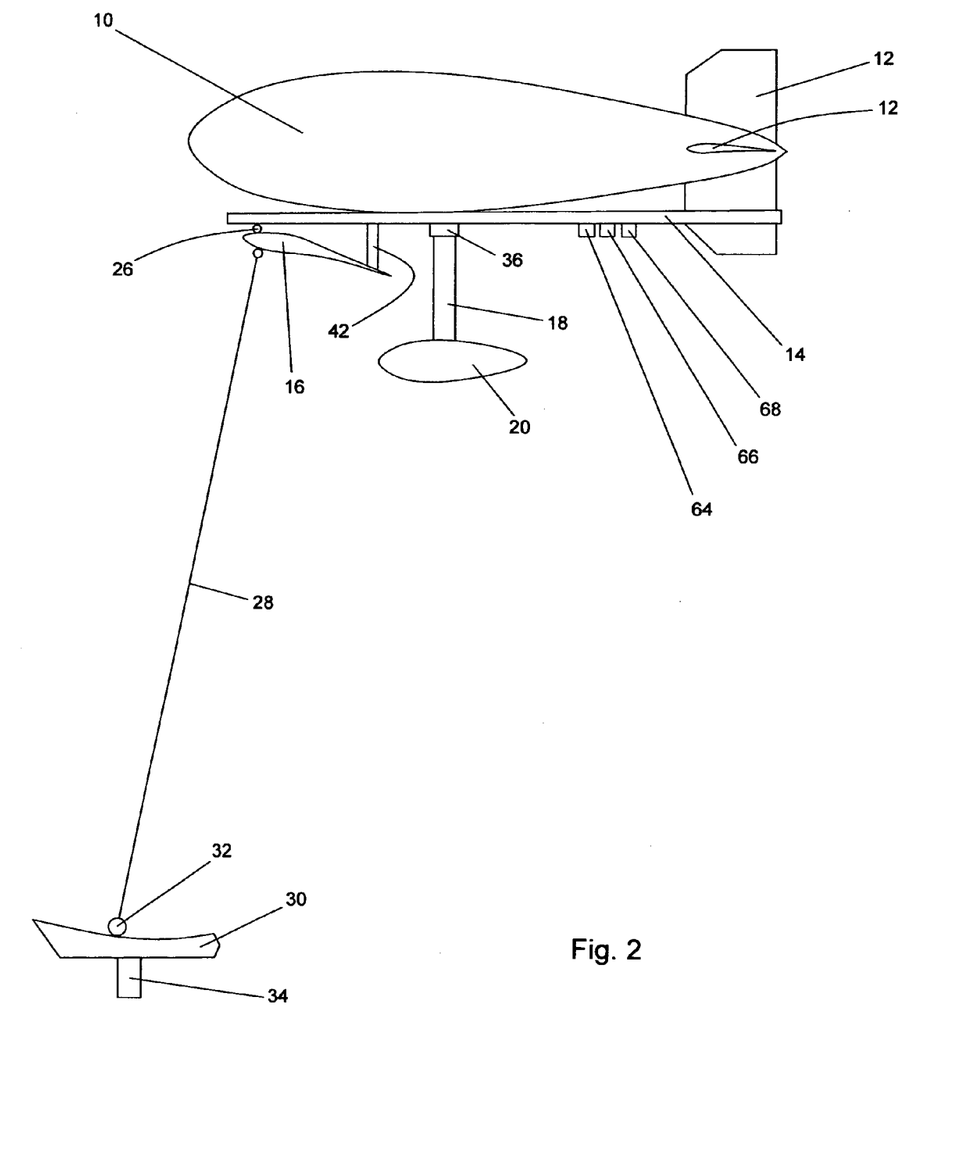
FIG. 2 shows a side view of the preferred embodiment with a few additional features and with the apparatus in the horizontal (un-tilted) position.

FIG. 2. Shows a side view of the preferred embodiment with a few additional features. The apparatus is shown in the horizontal position where it would only be developing dynamic lift not the lateral propulsive forces. Wing 16 is connected to spar 14 with a hinge 26 on the forward side and by an actuator 42 on the rearward. Actuator 42 is used to control the angle of attack of wing 16. A conventional radio control system 64 is used to control all actuators. With either tilting method a conventional altitude (or attitude) sensor 68, (such as an altimeter, sonar or radar) may be used together with a conventional control system 66 to provide feedback to the actuators so that a desired altitude may be maintained.

Figure 3:
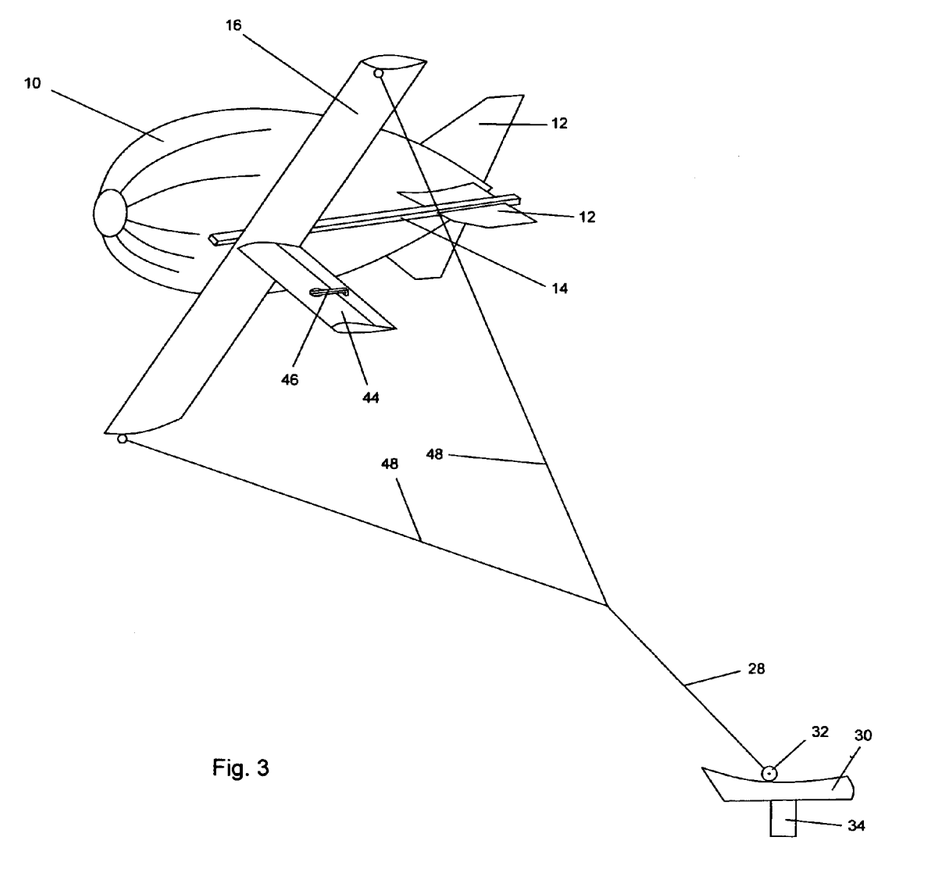
FIG. 3 shows a perspective view of an alternative embodiment with a tether harness and a lateral control wing.

FIG. 3. Shows an alternative embodiment of the invention. A harness 48 is attached to the port and starboard sides of wing 16 and connected to tether 28.

In this case the apparatus cannot be tilted about the longitudinal axis directly since the harness will prevent this. A lateral control wing with control surface 44 is attached perpendicularly to the lower surface of wing 16. Lateral control wing 44 is used to generate a side force so that the apparatus can be moved in an arc about boat 30. An actuator 46 and a remote control system (not shown) allows lateral control wing 44 to be used to maintain a desired altitude and to position the apparatus for a port or starboard tack.

Figure 4:
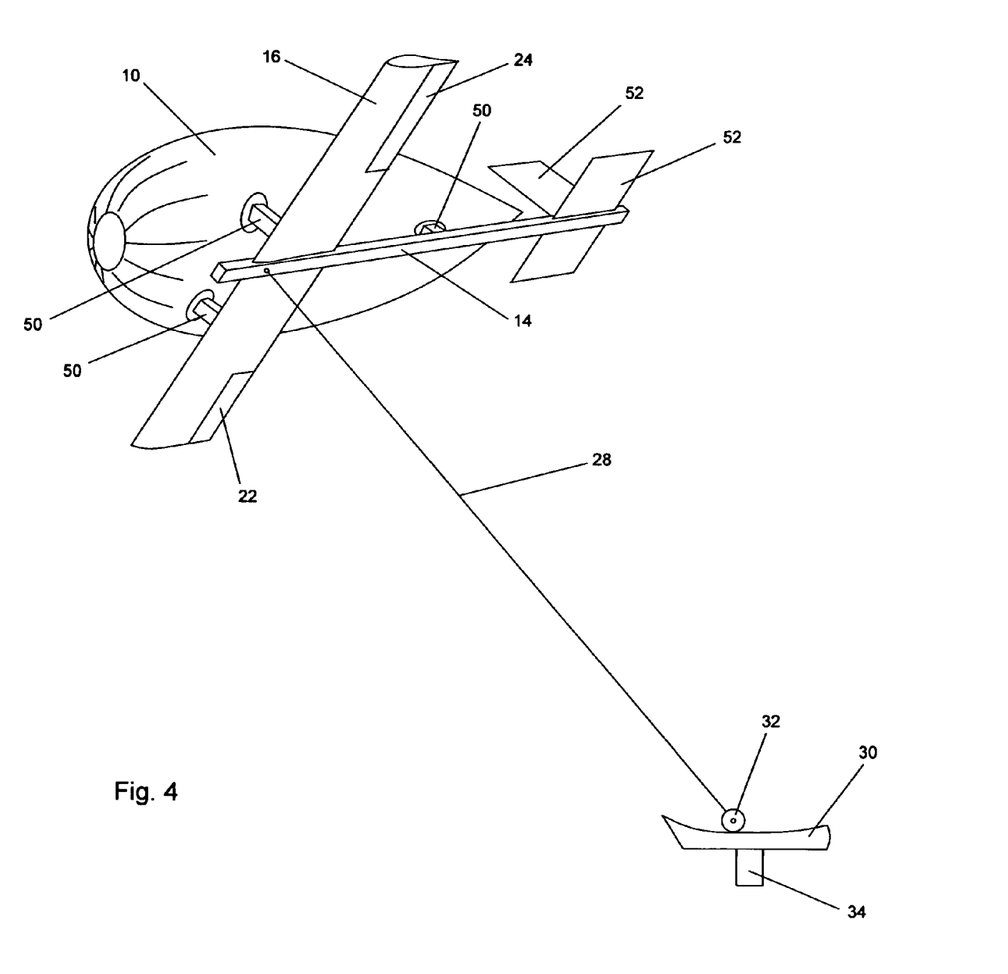
FIG. 4 shows a perspective view of an alternative embodiment of the apparatus with aircraft style aerodynamic stabilizers instead of blimp tail fins.

FIG. 4. Shows an alternative embodiment where the directional tail-fins of the blimp are replaced by aircraft-style stabilizers. Aircraft-style stabilizers 52 are attached to the rear end section of spar 14. Three pylons 50 attach wing 16 and spar 14 to blimp 10. The aircraft-style stabilizers 52 will keep blimp 10 directed into the wind for minimum drag (in addition to keeping wing 16 directed into the wind for a desired angle of attack). Reasons for using this embodiment are greater ease of construction, assembly and storage.

Figure 5:
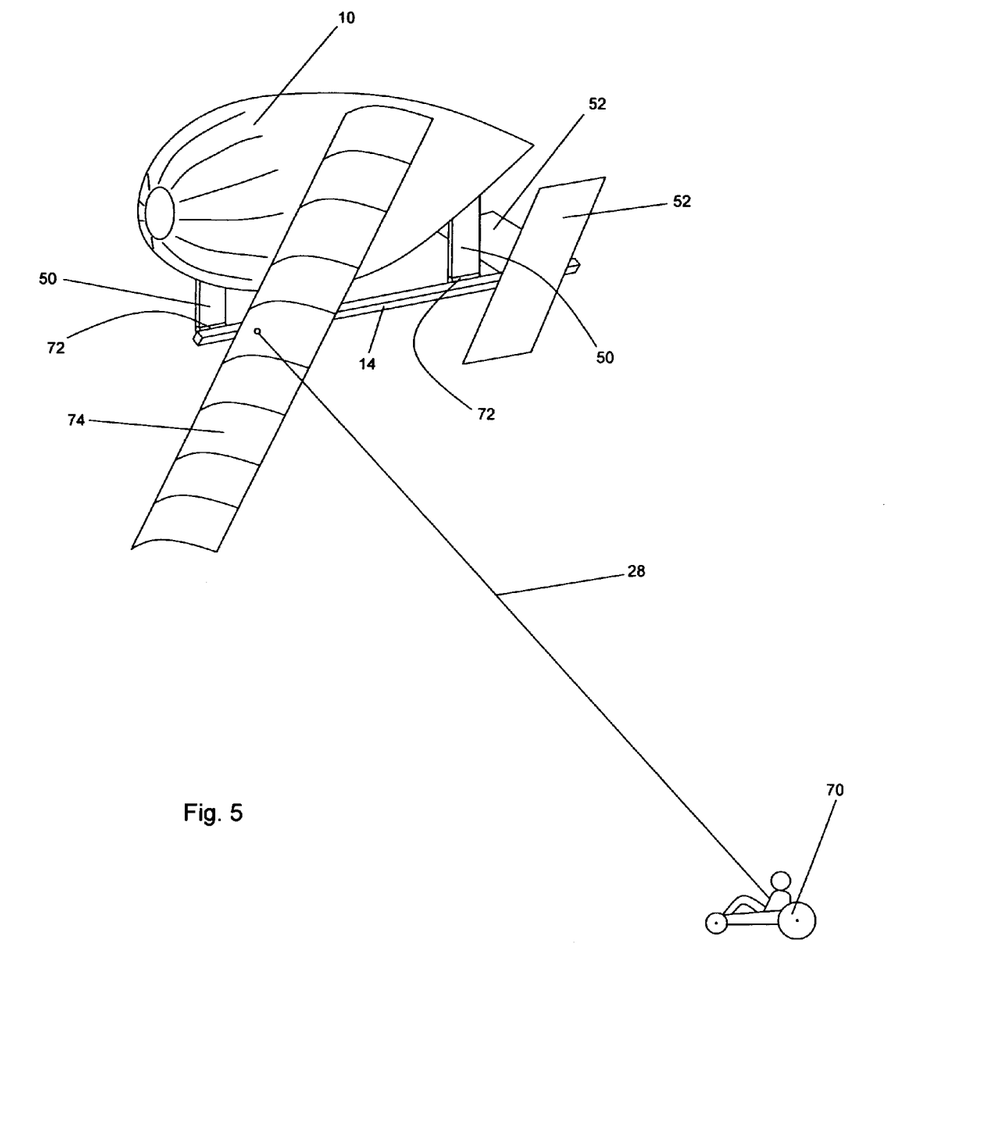
FIG. 5 shows a perspective view of an alternative embodiment of the apparatus where only the wing is tilted not the blimp.

FIG. 5. Shows an alternative embodiment where only an aerodynamic lifting surface (wing or sail) 74 is tilted and the blimp stays horizontal. Two pylons 50 attached to blimp 10 are connected to spar 14 by two hinges 72 so that spar 14 may rotate about a longitudinal axis. Aircraft-style stabilizers 52 attached to the rear end of spar 14 direct blimp 10 into the wind for minimum drag. Lifting surface 74 is attached to spar 14 so that it may be tilted about the longitudinal axis. Reasons for using this embodiment are to reduce the turning moment required to tilt lifting surface 74. Also shown is an alternative lateral propulsive force resisting vehicle.

Operation of the Invention—Sailing Theory

For the purposes of this application sailing can be defined as the extraction and controlled application of propulsive power from the difference in relative velocity between the air and water (or some other medium). It is emphasized that the power is obtained from the wind, and no other power source-such as by the combustion of fossil fuels. The controlled application of the propulsive power indicates that multiple courses may be sailed for any given wind direction and that progress into the wind can be made by tacking.

Sailing is usually accomplished with two airfoils, one in the air and one in the water. Each produces lift (in a horizontal direction) and drag. To sail close reached (almost into the wind) a large aerodynamic lift is substantially opposed by an equivalent hydrodynamic lift, with only a small difference vector remaining to propel the vehicle.

The apparatus described in this application would replace the mast, sail and rigging of a conventional sailboat. A water-borne vessel with conventional centerboard or keel must still be used to resist the lateral forces generated by this apparatus. However the design of the vessel may deviate from sailboat convention, since there would be no need to generate a righting moment. Other vehicles may be used for propulsion across other mediums, but they are still required to resist the lateral propulsive force. (Examples are land buggies, and snow, ice or water skis.)

Some observations from sailing theory:
(a) To sail fast (faster than the true wind speed) it is essential to have both a low aerodynamic and a low hydrodynamic drag-angle (high lift-to-drag ratio).
(b) For wings operating at high lift coefficients where induced drag predominates, reduced drag is highly dependent upon having a high aspect-ratio.
(c) High aspect-ratio wings are very sensitive to the angle-of-attack and are therefore more difficult to stabilize and control.
(d) The aerodynamic drag of a streamlined blimp is less than one tenth that of a spherical balloon having the same volume.
(e) To support a given payload mass over water (to prevent it from sinking), a streamlined blimp has less than one tenth the drag of a hull that displaces the same mass.

Operation of the Invention—Details

The complete apparatus will be slightly positively buoyant, so that in zero wind it will float up. Blimp 10 will be sized so that it can lift the entire weight of the apparatus.

The wing or sail generates lift from the wind. When the wing is tilted the vertical component of this lift is termed dynamic lift and the horizontal component is termed lateral propulsive force. The term lateral propulsive force refers to that force typically generated by a sail and largely opposed by the keel or centerboard of a boat. Some dynamic lift is desirable to prevent the apparatus from being pushed into the water by the lateral propulsive force. Once the angle of tilt is set, the apparatus will position itself so that all forces are balanced by those transferred along the tether. If the apparatus is neutrally buoyant the dynamic lift, the drag and the lateral propulsive force will change at substantially the same rate with changes in wind speed, and the apparatus will maintain its attitude and altitude.

The angle of attack for the wing or sail determines how much lift it will produce at a given wind speed. For some applications this can be fixed for simplicity. Either set it for maximum lift or for maximum lift-to-drag ratio. The aileron style control surfaces (22 and 24) can also be used to effectively alter the angle of attack. Advantages to controlling the angle of attack are that it can be set high or low depending on the wind speed. The dynamic lift can also be reduced to ease retrieval of the apparatus. A winch 32 on the boat 30 facilitates retrieval.

Wing or sail 16 may be any aerodynamic lift-generating surface. Examples are rigid wings or a flexible sails with mast like spars similar to many kites. The spars may be inflated structures. One advantage of this invention is that the lift will only be generated from one side of the surface, unlike with conventional sails. This allows its design and construction to be optimized.

Figure 6:
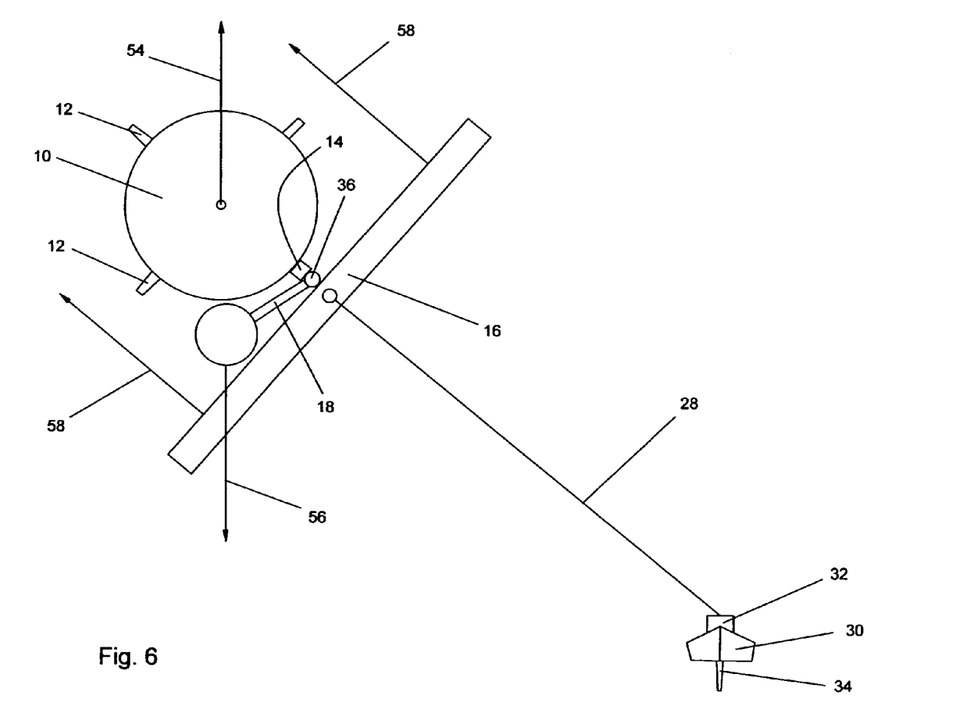
FIG. 6 shows a front view of the apparatus with movable ballast weight for tilt control.

Several methods have been described for tilting the apparatus. FIG. 6. Shows a front view of the apparatus with movable ballast weight for tilt control. The static lift, dynamic lift and lateral propulsive forces are indicated. One advantage of this method of tilting is that it will be dynamically stable without needing automatic altitude maintaining systems.

The design described for shifting the ballast should be considered a representative embodiment. There are many other methods for shifting the ballast weight. Pumping water from containers on each end of wing 16 is one example.

It should be noted that ballast weight 20 may comprise a significant part of the payload of the complete apparatus and the boat. The reason for this is that a blimp (or airship) can support a given mass over water with around one tenth the drag of any hull. For passengers of the apparatus there would be increased visibility and a more comfortable motion. However a water borne vehicle is still essential to counter the lateral propulsive force.

Figure 7:
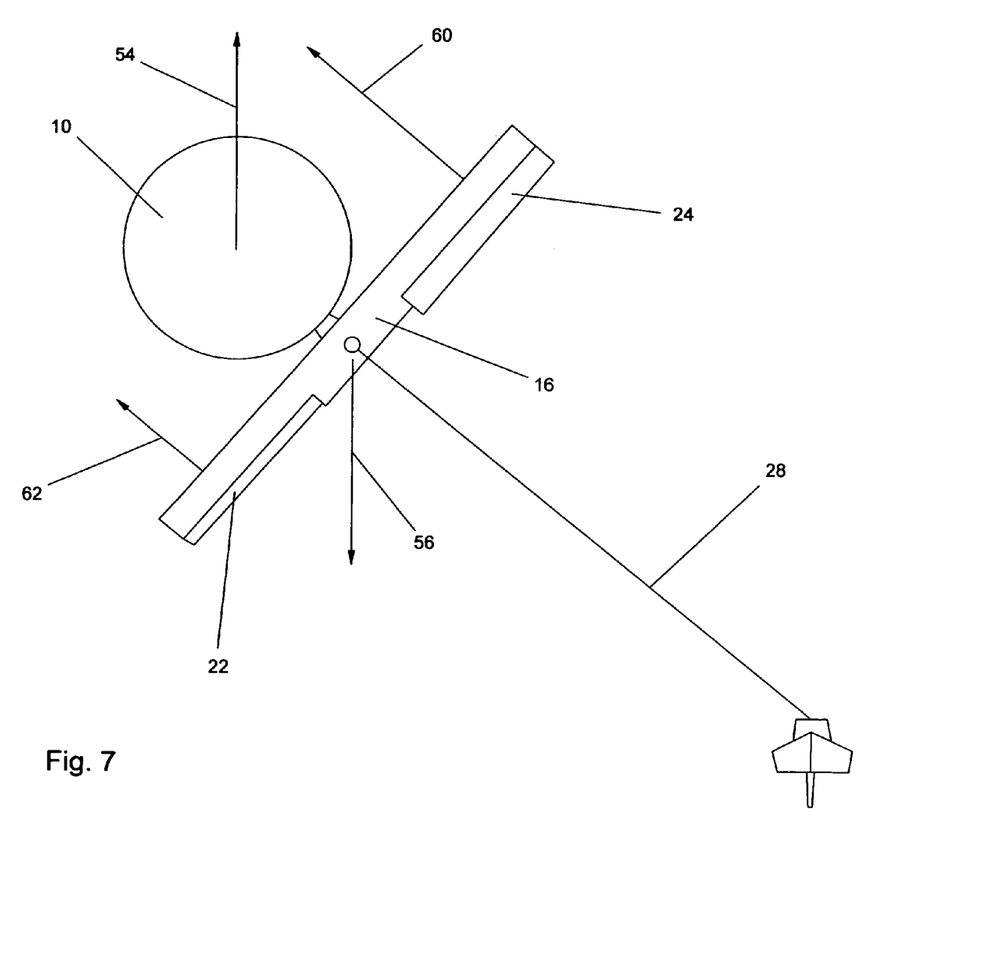
FIG. 7 shows a front view of the apparatus with aileron style control surfaces.

FIG. 7. Shows a front view of the apparatus with aileron style control surfaces. Here the center of mass is offset from the center of lift. This results in a righting moment, which attempts to return the apparatus to horizontal. The aileron style control surface on the upper wing will be set for greater lift than that of the lower wing. This will oppose the righting moment and keep the apparatus tilted.

CONCLUSION RAMIFICATIONS AND SCOPE OF THE INVENTION

The invention disclosed describes an apparatus that may be used for high-speed sailing having achieved:
(a) Negligible heeling moment.
(b) High lift-to-drag ratio through the use of a streamlined blimp, a high aspect-ratio wing, and aerodynamic stabilization.
(c) Operation over a large range of wind speed including zero wind.
(d) Effective control.
(e) Ease of launch and retrieval.
(f) Use of a single tether line.
(g) Simplified construction with fewer parts and less weight.

Obviously many modifications and variations of the present invention are possible in light of the above teachings. It is therefore to be understood that within the scope of the appended claims the invention may be practiced otherwise than specifically described.

I claim:

1. A method for sailing that utilizes the power of only a wind to sail on various chosen courses including courses that are angled into the wind the method comprising:
(a) providing an elevated unit comprising:
   i. a streamlined blimp containing a lighter than air gas;
   ii. a wing or sail for generating aerodynamic lift by action of the wind only;
   iii. stabilizing means for providing aerodynamic stabilization for said elevated unit so that said blimp is oriented into the wind for minimum drag and said wing or sail is oriented into the wind with a desired angle of attack;
   iv. tilting means for tilting said wing or sail or for tilting said elevated unit about a horizontal axis that is parallel to the direction of the wind so that said wing or sail remains oriented into the wind but is inclined at an angle so that the lift generated by said wing or sail has both a vertical and a horizontal, or lateral, component and so that said wing or sail may be tilted from one side to the other for tacking;
   v. structural means for connecting the components of said elevated unit together and transferring the forces between them;
(b) providing a surface unit comprising:
   i. a boat or other vehicle that is able to traverse the Earth's surface and support a payload;
   ii. a lateral force resisting means;
(c) providing a flexible tension member or tether, connecting said elevated unit and said surface unit;

(d) tilting said elevated unit about the longitudinal axis so that said wing generates a lateral propulsive force from the wind only, in addition to a dynamic lifting force; and (e) allowing the wind to impinge on said wing, thereby allowing said elevated unit to generate a predominately lateral force by action of the wind only, which is substantially, but not entirely, opposed by a lateral resisting force generated by said surface unit, by action of the Earth's surface, so that a propulsive force is produced, and thereby utilizing the power of only the wind to sail on a chosen course including a course that is angled into the wind.

* * * * *